United States Patent
Hirasawa et al.

(10) Patent No.: US 10,872,704 B2
(45) Date of Patent: Dec. 22, 2020

(54) WATER INJECTION DEVICE

(71) Applicants: Hitachi-GE Nuclear Energy, Ltd., Hitachi (JP); Okano Valve Mfg. Co. Ltd., Kitakyushu (JP)

(72) Inventors: Daisuke Hirasawa, Hitachi (JP); Yoshihisa Kiyotoki, Hitachi (JP); Hisashi Satou, Hitachi (JP); Keisuke Sakemura, Kitakyushu (JP); Keiji Sasaki, Kitakyushu (JP); Yuta Fukuda, Kitakyushu (JP)

(73) Assignees: Hitachi-GE Nuclear Energy, Ltd., Hitachi (JP); Okano Valve Mfg. Co. Ltd., Kitakyushu (JP)

(*) Notice: Subject to any disclaimer, the term of this patent is extended or adjusted under 35 U.S.C. 154(b) by 462 days.

(21) Appl. No.: 15/852,817

(22) Filed: Dec. 22, 2017

(65) Prior Publication Data

US 2018/0182500 A1    Jun. 28, 2018

(30) Foreign Application Priority Data

Dec. 26, 2016  (JP) ................................ 2016-250974

(51) Int. Cl.
*G21C 9/00* (2006.01)
*G21C 15/18* (2006.01)
*G21C 15/243* (2006.01)
*G21C 9/016* (2006.01)

(52) U.S. Cl.
CPC .............. *G21C 15/18* (2013.01); *G21C 9/016* (2013.01); *G21C 15/243* (2013.01); *G21C 15/185* (2019.01); *Y02E 30/30* (2013.01)

(58) Field of Classification Search
CPC .......... G21C 9/00; G21C 9/004; G21C 9/008; G21C 9/012; G21C 9/04; G21C 9/06
See application file for complete search history.

(56) References Cited

FOREIGN PATENT DOCUMENTS

| JP | 2011-133372 A | | 7/2011 |
|---|---|---|---|
| JP | 2011133372 A | * | 7/2011 |

* cited by examiner

Primary Examiner — Marshall P O'Connor
(74) Attorney, Agent, or Firm — Crowell & Moring LLP

(57) ABSTRACT

A high reliable water injection device is provided that injects water into a reactor containment vessel and can reliably shut off cooling water at normal times and quickly and reliably inject water into the reactor containment vessel without the need for external power, in a case of emergency. The water injection device injects water into a reactor containment vessel includes a flow path through which cooling water is supplied; a disk that closes the flow path; a swing arm that is connected to the disk and performs closing and opening of the flow path by the disk; and a weight that is connected to the swing arm via a swing lever, in which the weight is supported by a support member made of a low melting point alloy.

6 Claims, 4 Drawing Sheets

[Fig. 1]
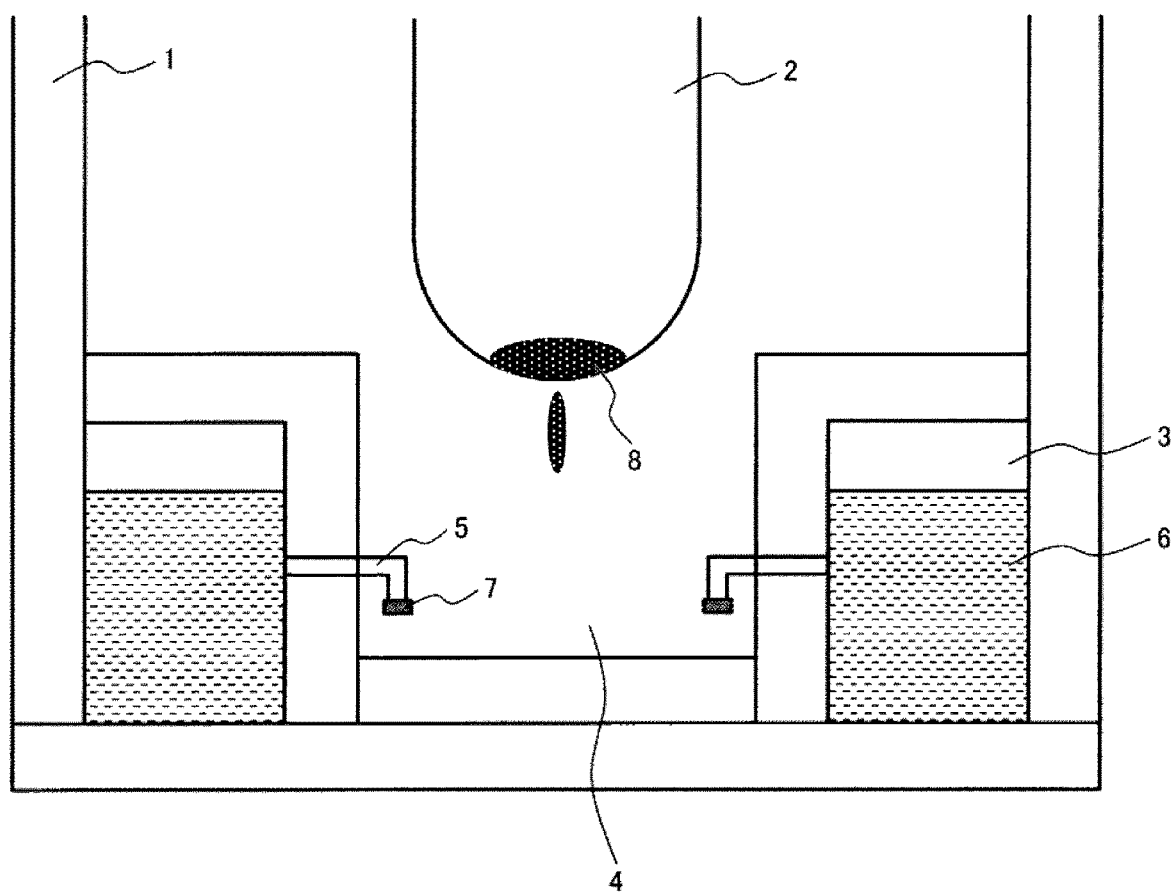

[Fig. 2]
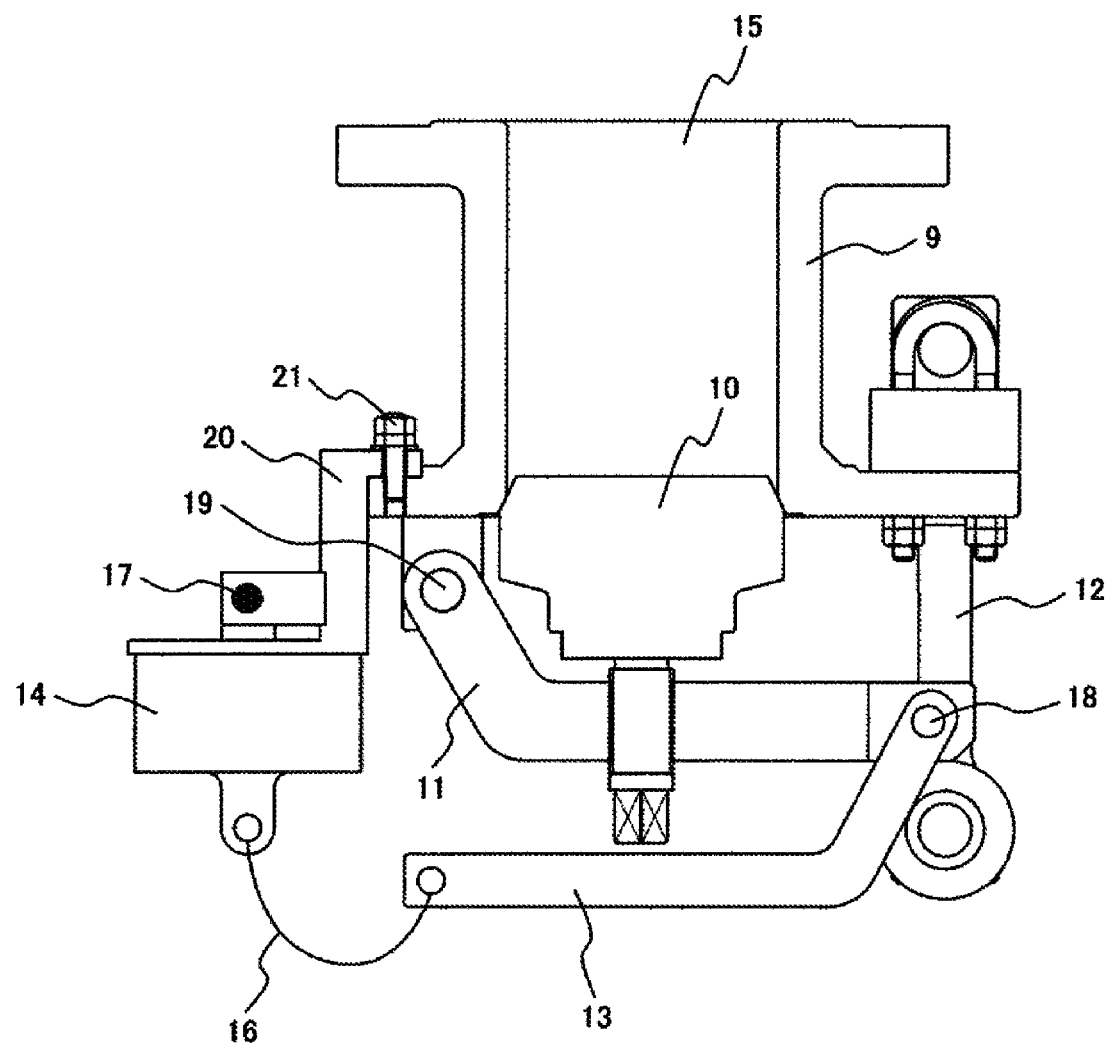

[Fig. 3]
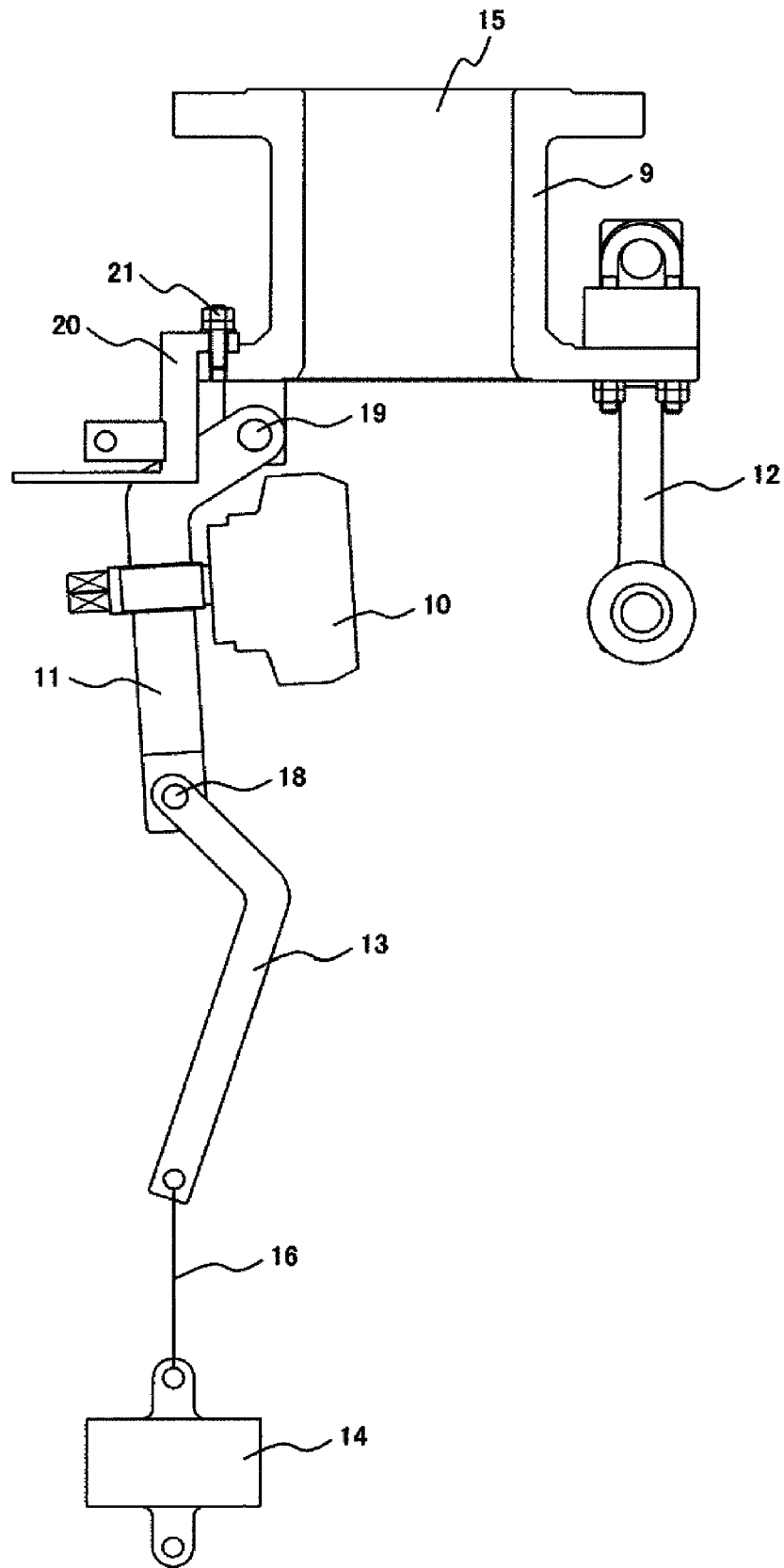

[Fig. 4]
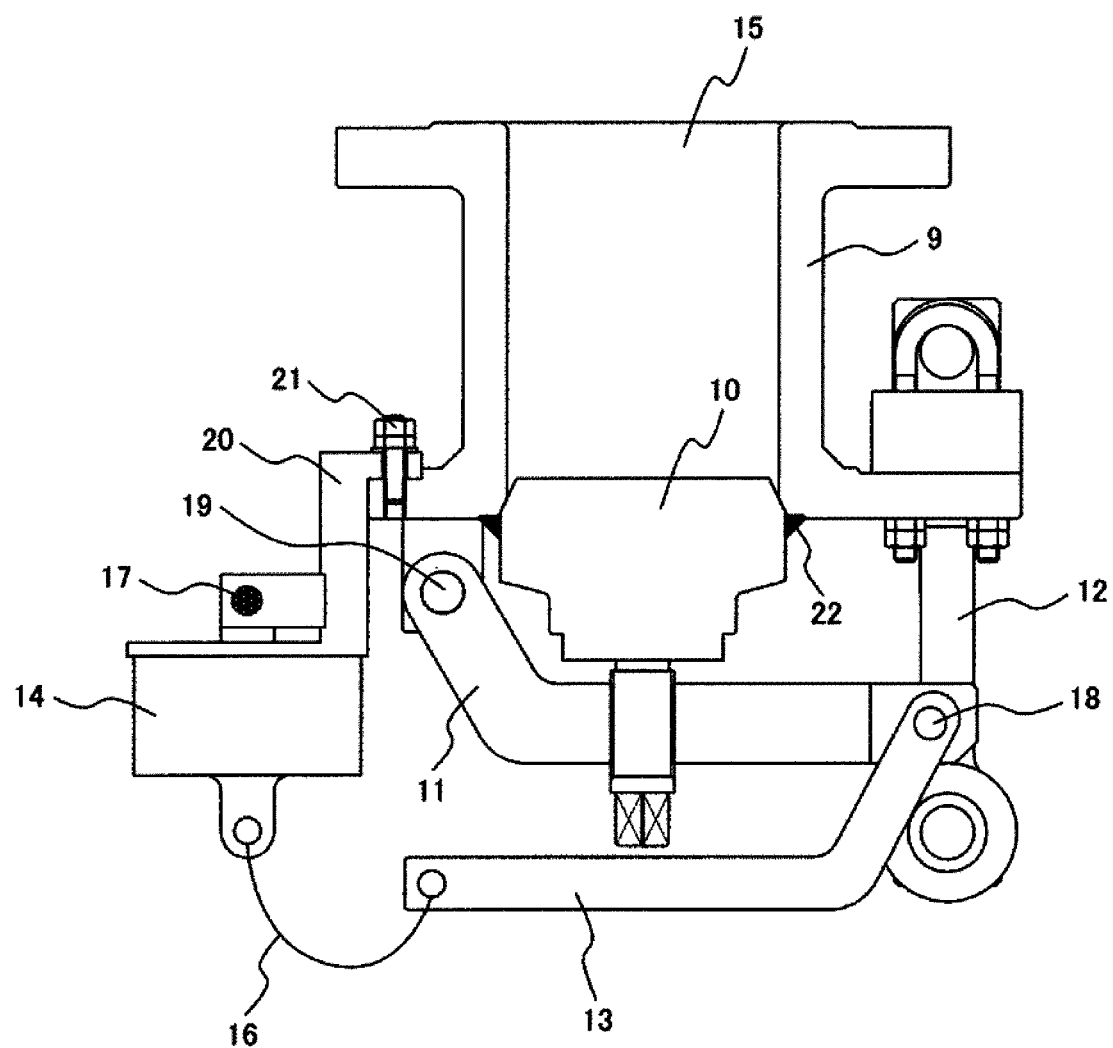

WATER INJECTION DEVICE

CLAIM OF PRIORITY

The present application claims priority from Japanese Patent application serial no. 2016-250974, filed on Dec. 26, 2016, the content of which is hereby incorporated by reference into this application.

TECHNICAL FIELD

The present invention relates to a structure of a reactor containment vessel, and in particular, to an effective technique that is applied to a water injection device which injects water into a reactor containment vessel in an emergency.

BACKGROUND ART

In water-cooled reactors, if cooling water is lost due to stoppage of feed water into a reactor pressure vessel or breakage of a pipe connected to the reactor pressure vessel, the reactor water level drops, a core is exposed, and thus there is a possibility that cooling becomes insufficient. Assuming such a case, an emergency stop of the reactor is automatically performed by the signal of the water level drop, the core is flooded and cooled by injection of cooling water by an emergency core cooling device, and a core melting accident is prevented in advance.

However, although it is extremely low probability, it can be also assumed that the emergency core cooling device is not operated and other water injection devices to core cannot be used. In such a case, it is considered that the core is exposed in the gas phase due to the lowering of the water level of the reactor, sufficient cooling is not performed, the temperature of a fuel rod rises due to a decay heat that continues to occur even after the stop of the reactor, and finally the core is melted. When such a serious accident (severe accident) progresses, the high temperature core melt (corium) melts down to the lower portion of the reactor pressure vessel, further melts and penetrates a bottom portion of the reactor pressure vessel, and falls on the floor in the reactor containment vessel (hereinafter simply referred to as "containment vessel").

If the reaction between concrete forming the containment vessel floor and corium continues, there is a concern that the containment vessel is damaged and thus a radioactive material in the containment vessel is released to the external environment. In order to suppress the reaction between the corium and the concrete, it is studied to provide facilities to inject water onto the corium. Especially, during the severe accident, application of static systems which can be expected to operate even considering various adverse conditions such as loss of all AC power supply and delay of operator's operation is being studied and the water injection device using a fusion valve is also one of the static systems. As the fusion valve, a temperature-actuated valve mechanism is studied which is closed during a normal operation of a nuclear power plant and is automatically opened when the temperature of a lower portion of the reactor containment vessel is higher than a predetermined temperature that is higher than that of the normal operation.

As a background art in this technical field, there is a technique such as PTL 1, for example. PTL 1 discloses "a nuclear power plant that has a temperature operating check valve including a temperature operating valve function which is normally closed and is opened when the temperature in the lower dry well becomes higher than a predetermined temperature and a check valve function which allows a flow from a pressure suppression pool side toward the lower dry well side and blocks the flow from the lower dry well side toward the pressure suppression pool side".

CITATION LIST

Patent Literature

PTL 1: JP-A-2011-133372

SUMMARY OF INVENTION

Technical Problem

PTL 1 describes a water injection device in which a disk is pushed up by a water head of cooling water and is slid inside a fixed guide portion to open a flow path. However, in the water injection device described in PTL 1, a holding member made of a low melting point alloy is used for fixing the disk, and there is a problem that a force for closing the flow path depends on the mechanical characteristics of the low melting point alloy.

In other words, since the disk 26 as the movable closing member is always subjected to the water pressure of the pressure suppression pool 7, reliability in terms of strength of the holding member made of the low melting point alloy 21 is concerned. In addition, since the holding member is cooled by the water of the pressure suppression pool 7, there is also a problem that the operation at the time of temperature rise is likely to become unstable.

An object of the present invention is to provide a high reliable water injection device which injects water into a reactor containment vessel and can reliably shut off cooling water at normal times and quickly and reliably inject water into the reactor containment vessel without the need for external power, in a case of emergency.

Solution to Problem

In order to solve the problems described above, according to the present invention, there is provided a water injection device that injects water into a reactor containment vessel, the device including: a flow path through which cooling water is supplied; a disk that closes the flow path; a swing arm that is connected to the disk and performs closing and opening of the flow path by the disk; and a weight that is connected to the swing arm via a swing lever, in which the weight is supported by a support member made of a low melting point alloy.

Advantageous Effects of Invention

According to the present invention, a high reliable water injection device which injects water into a reactor containment vessel and can reliably shut off cooling water at normal times and quickly and reliably inject water into the reactor containment vessel without the need for external power, in a case of emergency.

The problems, configurations, and effects other than those described above will be clarified by the description of the embodiments to be described below.

BRIEF DESCRIPTION OF DRAWINGS

FIG. 1 is a schematic diagram of a reactor containment vessel provided with a water injection device according to one embodiment of the present invention.

FIG. 2 is a cross-sectional view illustrating a state before operation of the water injection device according to one embodiment of the present invention.

FIG. 3 is a cross-sectional view illustrating a state after operation of the water injection device according to one embodiment of the present invention.

FIG. 4 is a view illustrating a modification example of FIG. 2.

DESCRIPTION OF EMBODIMENTS

Hereinafter, examples of the present invention will be described below with reference to the drawings. In each drawing, the same components are denoted by the same reference numerals and a detailed description of overlapping portions will be omitted.

Example 1

Hereinafter, one example of the present invention will be described with reference to FIG. 1 to FIG. 3. FIG. 1 is a schematic diagram of a nuclear power plant (reactor containment vessel) including a water injection device in this example. FIG. 2 and FIG. 3 are cross-sectional views illustrating the water injection device of this example, FIG. 2 illustrates a state before the water injection device opens a flow path and FIG. 3 illustrates a state where the water injection device opens the flow path.

As illustrated in FIG. 1, the nuclear power plant includes a reactor pressure vessel 2 which is installed in a reactor containment vessel 1, a suppression pool (pressure suppression pool) 3, a lower dry well 4, and a pipe 5 which connects the suppression pool 3 and the lower dry well 4 to each other. The cooling water 6 in the suppression pool 3 flows into the lower dry well 4 via the pipe 5.

At an end portion of the pipe 5 on the lower dry well 4 side, a water injection device 7 is provided. In a severe accident, a high-temperature corium (core melt) 8 is generated in the reactor pressure vessel 2. Along with the progress of the severe accident, the corium 8 melts and penetrates through the lower portion of the reactor pressure vessel 2 and falls into the lower dry well 4. The water injection device 7 injects the cooling water 6 of the suppression pool 3 into the lower dry well 4 by opening a flow path of the cooling water 6 for the purpose of cooling the corium 8 that is fallen into the lower dry well 4.

As illustrated in FIG. 2, the water injection device 7 includes a body 9, a disk 10, a swing arm 11, an arm 12, a swing lever 13, and a weight 14. The body 9 is a cylindrical member and a flow path 15 through which a fluid flows is formed therein. The flow path 15 communicates with a flow path (not illustrated) in the pipe 5. The disk 10 closes or opens the flow path 15 in the body 9 and injects the cooling water flowing in the body 9.

A close contact portion between the body 9 and the disk 10 may be formed by metal touch by contact between the metal members, and a sealing member such as a gasket or an O-ring may be used. In addition, as will be described below, in order to improve a sealing performance, seal welding may be performed on the close contact portion by welding with a low melting point alloy.

The disk 10 is fastened (coupled) to the swing arm 11, and the disk 10 is fixed to a closed position of the flow path 15 by pulling up and fixing the swing arm 11 to the upper portion by the arm 12. One end portion of the swing arm 11 is rotatably supported by the body 9 by a fulcrum B 19, the opposite end portion thereof is rotatably connected to the swing lever 13 by a fulcrum A 18, and the weight 14 is connected to a tip of the opposite side of the swing lever 13 by way of a wire 16.

The weight 14 is fixed to the body 9 by a member 17 using a low melting point alloy, for example, a columnar pin. The weight 14 may be directly fixed to the body 9 by welding with a low melting point alloy. The member 17 using this low melting point alloy melts or softens when the temperature in the lower dry well 4 rises above a predetermined temperature due to the severe accident and releases the fixation of the weight 14 to the body 9.

Although the temperature of a fuel in the reactor pressure vessel 2 is usually about 1000° C. to 2000° C., when the high-temperature corium 8 falls into the lower dry well 4 due to core melting, the temperature in the lower dry well 4 becomes about 260° C. Therefore, preferably, the low melting point alloy used to the member 17 uses an alloy which is in a solid state at a temperature lower than 200° C. and is in a liquid state at 260° C.

As an example of this low melting point alloy, an alloy including antimony (Sb): 8.0 mass % to 12.5 mass %, silver (Ag): 0 to 6.0 mass %, and copper (Cu): 0 to 1.5 mass %, or the like can be used, for example. In addition, these alloys may further include tin (Sn) and inevitable elements.

Along the release of the fixing, the weight 14 falls by its own weight. The impact load of the fall is transmitted to the swing lever 13 via the wire 16. Instead of this wire 16, a similar impact load transmission effect can be obtained even as a member such as a rail shape along which the weight 14 is slid down.

The swing lever 13 which receives the impact load of the fall is rotated so as to push out the arm 12 about the fulcrum A 18 and releases the fixing of the swing arm 11 and the disk 10 by the arm 12. For the purpose of promoting the pushing out of the arm 12 by the swing lever 13, a member such as a bearing may be used at the contact portion between the swing lever 13 and the arm 12.

FIG. 3 illustrates a state where the member 17 using the low melting point alloy melts and the closing of the flow path 15 by the disk 10 is released. As illustrated in FIG. 3, the swing arm 11 and the disk 10 from which the fixing by the arm 12 is released, are rotated about the fulcrum B 19 by own weight thereof and open the flow path 15.

As described above, the water injection device of this example has a mechanism which closes the body 9 forming the flow path 15 using the disk 10 and opening of the flow path 15 includes a mechanism which transmits the falling load of the weight 14 fixed by the member 17 using a low melting point alloy to body 9 to the arm 12 via the swing lever 13 and releases the fixing of the swing arm 11 and the disk 10 by the arm 12.

For example, in the related art as in PTL 1, since the low melting point alloy is directly incorporated in the mechanism which closes the flow path, although the closing force of the flow path depends on the mechanical characteristics of the low melting point alloy, in this embodiment, the low melting point alloy is used for fixing the weight 14 to the body 9, and it is possible to reliably close the flow path 15 without depending on the mechanical characteristics of the low melting point alloy (first action).

In addition, since the low melting point alloy is separated from a portion closing the flow path 15 and is disposed at a position directly exposed to the surrounding environment, when the lower dry well 4 reaches a predetermined temperature, the flow path 15 cooling water can be appropriately opened according to the surrounding environment temperature without being affected by the cooling from the cooling water 6 (second action).

In addition, the member 17 using the low melting point alloy and the weight 14 are fixed to the body 9 via a bracket 20 with bolts and nuts 21 and, by making the member 17 using the low melting point alloy, the weight 14, and the bracket 20 exchangeable in an integrated state, the low melting point alloy can be exchanged without adjustment to the closing mechanism. In other words, by making the weight 14 and the pin 17 into a unit to be an exchange component, on-site maintenance correspondence becomes easy (third action).

Example 2

With reference to FIG. 4, a water injection device of Example 2 will be described. FIG. 4 illustrates a modification example of the water injection device illustrated in FIG. 2 and is an example in which a seal weld 22 is formed by welding with a low melting point alloy at the close contact portion between the body 9 and the disk 10 and the sealing performance (closing performance) of the flow path 15 by the disk 10 is improved.

When the flow path 15 is closed using the disk 10, the disk 10 is constantly receiving the water pressure from the cooling water in the flow path 15, and due to aged deterioration, there is a concern about leakage of the cooling water from the close contact portion (joint portion) between the body 9 and the disk 10 or the like. In addition, it is also assumed that an unfamiliar operator mistakenly pulls out the pin 17 and unnecessary water injection may be performed.

Therefore, in addition to supporting the swing arm 11 and the disk 10 by the arm 12, by forming the seal weld 22 in the close contact portion between the body 9 and the disk 10 as in this example, the seal (closing) of the flow path 15 with the disk 10 can be made more reliable. In addition, even if an operator erroneously pulls out the pin 17, sealing (closing) of the flow path 15 by the disk 10 is maintained and unnecessary water injection can be avoided.

Although the pin 17 and the seal weld 22 simultaneously melt and water can be injected at the time of the severe accident, as the low melting point alloy having the same composition as that of the pin 17 is used to form the seal weld 22, since the seal weld 22 is cooled by the cooling water in the flow path 15, even though the pin 17 melts and the weight 14 falls, there is a concern that the seal weld 22 does not melt and water is not injected while the seal of the flow path 15 by the disk 10 is maintained. Therefore, it is desirable that the seal weld 22 is formed by using a low melting point alloy having a melting point lower than that of the pin 17, and is melted before the pin 17.

As explained above, according to each example, by separating the low melting point alloy from the closing mechanism portion of the water injection device, it is possible to shut off the cooling water independently of the mechanical characteristics of the low melting point alloy and it is possible to further improve the reliability of the water injection device for the reactor containment vessel.

The present invention is not limited to the examples described above but includes various modification examples. For example, the examples described above have been described in detail in order to explain the present invention in an easy-to-understand manner, and are not necessarily limited to those having all the configurations described. In addition, a portion of the configuration of one example can be replaced by the configuration of another example, and the configuration of another example can be also added to the configuration of one example. In addition, it is possible to add, delete, and replace other configurations with respect to a portion of the configuration of each example.

REFERENCE SIGNS LIST

1 . . . reactor containment vessel, 2 . . . reactor pressure vessel, 3 . . . suppression pool (pressure suppression pool), 4 . . . lower dry well, 5 . . . pipe, 6 . . . cooling water, 7 . . . water injection device, 8 . . . corium (core melt), 9 . . . body, 10 . . . disk, 11 . . . swing arm, 12 . . . arm, 13 . . . swing lever, 14 . . . weight, 15 . . . flowpath, 16 . . . wire, 17 . . . member (pin) using low melting point alloy, 18 . . . fulcrum A, 19 . . . fulcrum B, 20 . . . bracket, 21 . . . bolt and nut, 22 . . . seal weld.

The invention claimed is:

1. A water injection device that injects water into a reactor containment vessel, the device comprising:
a flow path through which cooling water is supplied;
a disk that closes the flow path;
a swing arm that is connected to the disk and performs closing and opening of the flow path by the disk; and
a weight that is connected to the swing arm via a swing lever, wherein
the weight is supported by a support member made of a low melting point alloy,
the swing arm has one end which is rotatably supported by a body of the water injection device and another end which is rotatably connected to the swing lever,
an end portion of a side opposite to an end portion which is connected to the swing arm of the swing lever is connected to the weight via a wire, and
the low melting point alloy is an alloy that is in a solid state at a temperature lower than 200° C. and is in a liquid state at 260° C.

2. The water injection device according to claim 1, wherein the flow path is closed by the disk by a connection portion between the swing arm and the swing lever being supported by an arm rotatably provided with respect to the body of the water injection device.

3. The water injection device according to claim 1, wherein the disk is seal welded to a body of the water injection device using a metal material having a melting point lower than that of the low melting point alloy constituting the support member.

4. The water injection device according to claim 1, wherein the support member melts due to the temperature rise of the surrounding environment of the water injection device, the weight falls, the disk is released due to the fall of the weight, and water is injected into the reactor containment vessel.

5. The water injection device according to claim 1, wherein the low melting point alloy constituting the support member is an alloy including Sb: 8.0 mass % to 12.5 mass %, Ag: 0 to 6.0 mass %, and Cu: 0 to 1.5 mass %.

6. The water injection device according to claim 5, wherein the low melting point alloy constituting the support member is an alloy further including Sn.

* * * * *